United States Patent
Ikuno (10) Patent No.: US 11,418,680 B2
(45) Date of Patent: Aug. 16, 2022

(54) APPARATUS AND METHOD TO PRINT PATCH IMAGES FOR A DENSITY ADJUSTMENT ON SHEETS

(71) Applicant: CANON KABUSHIKI KAISHA, Tokyo (JP)

(72) Inventor: Takao Ikuno, Ibaraki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/356,299

(22) Filed: Jun. 23, 2021

(65) Prior Publication Data

US 2021/0409571 A1    Dec. 30, 2021

(30) Foreign Application Priority Data

Jun. 30, 2020  (JP) ............................. JP2020-113360

(51) Int. Cl.
  *H04N 1/405*  (2006.01)
  *H04N 1/407*  (2006.01)
  *G03G 15/00*  (2006.01)

(52) U.S. Cl.
  CPC ............. *H04N 1/405* (2013.01); *G03G 15/50* (2013.01); *H04N 1/4078* (2013.01)

(58) Field of Classification Search
  CPC ....... H04N 1/405; H04N 1/4078; G03G 15/50
  See application file for complete search history.

(56) References Cited

U.S. PATENT DOCUMENTS

2014/0036282 A1* 2/2014 Tyagi ..................... H04N 1/54
                                                          358/1.9
2014/0037307 A1* 2/2014 Kuo ...................... G03G 15/01
                                                          358/1.9

FOREIGN PATENT DOCUMENTS

JP      2007124352 A    5/2007

\* cited by examiner

*Primary Examiner* — Quang N Vo
(74) *Attorney, Agent, or Firm* — Canon U.S.A., Inc. IP Division

(57) ABSTRACT

An apparatus prints images for a density adjustment on a plurality of sheets, reads the image on a sheet printed later among the plurality of printed sheets, determines a representative value by carrying out a calculation from at least a first density value read from an image at a predetermined position on a first sheet and a second density value read from an image at the predetermined position on a second sheet, which are printed later, and performs a print density adjustment using the determined representative density and a target density.

20 Claims, 8 Drawing Sheets

APPARATUS AND METHOD TO PRINT PATCH IMAGES FOR A DENSITY ADJUSTMENT ON SHEETS

BACKGROUND OF THE DISCLOSURE

Field of the Disclosure

The aspect of the embodiments relates to an image forming apparatus and a method for controlling an image forming apparatus.

Description of the Related Art

For image forming apparatuses, such as multifunction peripherals, change in conditions such as the toner remaining amount after printing a large number of sheets results in change in the print density. A print density adjustment function is available to adjust the change in the print density, and the execution of the adjustment work enables adjustment of the density in conformance with the current print density, which enables printing with a correct density.

As a method for the print density adjustment, first, the image forming apparatus prints a chart in which patches at a plurality of ideal densities are arranged on paper, and reads the printed chart by a scanner. The image forming apparatus compares the patch at the ideal density (a target density) and the density acquired by reading the printed chart. The image forming apparatus then corrects a conversion table for converting a multivalued image before printing into a binary image for printing with the density difference taken into account, thus conducting the print density adjustment.

Japanese Patent Application Laid-Open No. 2007-124352 discusses a method in which a chart used for the adjustment on a plurality of sheets is printed successively, the bundle of printed charts is placed on an automatic document feeder (ADF) collectively, and the printed charts are read successively by the ADF, thus conducting the print density adjustment.

In a case where the printing is carried out after the image forming apparatus is powered on from a powered-off state and the image forming apparatus is started up, the print density is unstable on first several sheets immediately after the startup. One reason therefor is that the temperature of the fixing device in the image forming apparatus does not yet fully increase although being higher than a printable reference temperature. Toner for printing in the toner cartridge may not be sufficiently stirred, which may cause slight unevenness in the print density. Due to these causes, slight unevenness may emerge in the chart for the print density adjustment if the print density adjustment is conducted immediately after the image forming apparatus is powered on.

SUMMARY OF THE DISCLOSURE

According to an aspect of the embodiments, an apparatus includes a printing unit configured to print patch images for a density adjustment on a plurality of sheets, a reading unit configured to read the patch images on the plurality of sheets in an order in which the plurality of sheets printed by the printing unit is printed, a determination unit configured to determine a representative density of densities acquired by reading the patch images by carrying out a weighted calculation for the densities acquired by reading the patch images such that a density acquired by reading a patch image on a sheet printed later is weighted more than a density acquired by reading a patch image on a sheet printed earlier among the plurality of sheets, and a performing unit configured to perform a print density adjustment using the determined representative density and a target density.

Further features of the disclosure will become apparent from the following description of exemplary embodiments with reference to the attached drawings.

DESCRIPTION OF THE EMBODIMENTS

In the following description, an exemplary embodiment for implementing the disclosure will be described with reference to the accompanying drawings.

Figure 1:
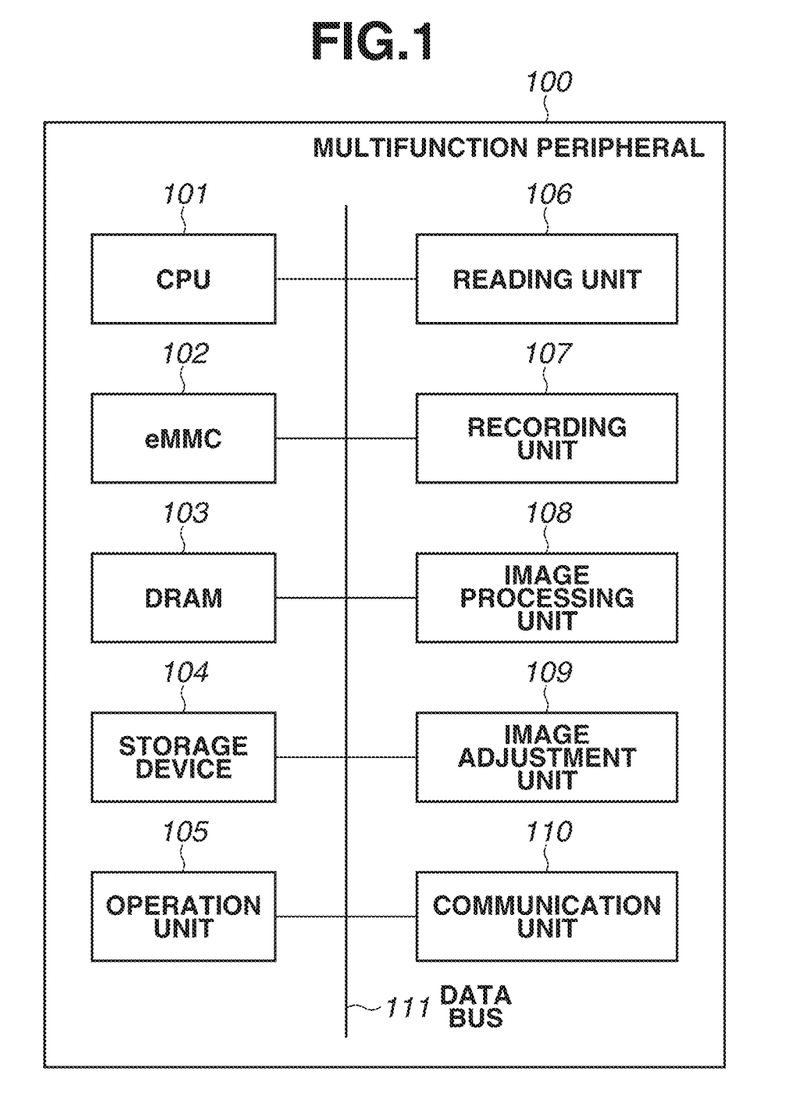
FIG. 1 illustrates an example of the hardware configuration of an image forming apparatus according to an exemplary embodiment of the disclosure.

A first exemplary embodiment of the disclosure will be described below. An example in a case where an image forming apparatus is embodied as a multifunction peripheral will be described. FIG. 1 illustrates an example of the hardware configuration of the multifunction peripheral. In a multifunction peripheral 100, a central processing unit (CPU) 101 is a control unit of the system and controls the entire apparatus. An embedded multimedia card (eMMC) 102 is formed by a flash memory, and is used to store a control program of the CPU 101. A dynamic random access memory (DRAM) 103 is used to store a program control variable and the like. The DRAM 103 is a volatile memory capable of temporarily storing therein, for example, image data that the CPU 101 processes. A storage device 104 is a storage device such as a hard disk drive (HDD) device, and is a nonvolatile memory that stores data, such as image data, therein. An operation unit 105 is an interface unit that displays information in the apparatus for a user.

A reading unit 106 (also referred to as a scanner 106) is a device that reads a document and converts it into binary data. A recording unit 107 is a device that prints the image data on a sheet (recording paper). At this time, the recording unit 107 places toner on the sheet (the recording paper), and fixes the toner onto the recording paper by pressing it with a heated fixing device. An image processing unit 108 performs processing of encoding and decoding the image data to be handled in the image printing. An image adjustment unit 109 carries out a calculation for an adjustment of a print density based on data obtained by the reading unit (a readout unit) 106 scanning a printed chart when conducting the print density adjustment. As a method for the print density adjustment, first, the multifunction peripheral 100 prints, on paper, a chart in which patch images are arranged with an ideal color density different from each other, and reads it by the scanner. The multifunction peripheral 100 compares the ideal density (a target density) and an image density obtained by reading the chart resulting from printing the patch images, thus comparing a difference between the ideal density value and the actual print density. The multifunction peripheral 100 then corrects a conversion table for converting a multivalued image before printing into a binary image for printing with the density difference taken into account, thus adjusting the print density. A communication unit 110 is an interface unit between the apparatus and an external communication network. Each of the processing units is connected via a data bus 111.

The multifunction peripheral 100 prints the image data on the print paper and outputs the resultant. The print density at the time of printing undesirably changes little by little due to a change in conditions, such as the toner remaining amount. A print density adjustment function is available to adjust this difference in the print density to a correct density.

Figure 2:
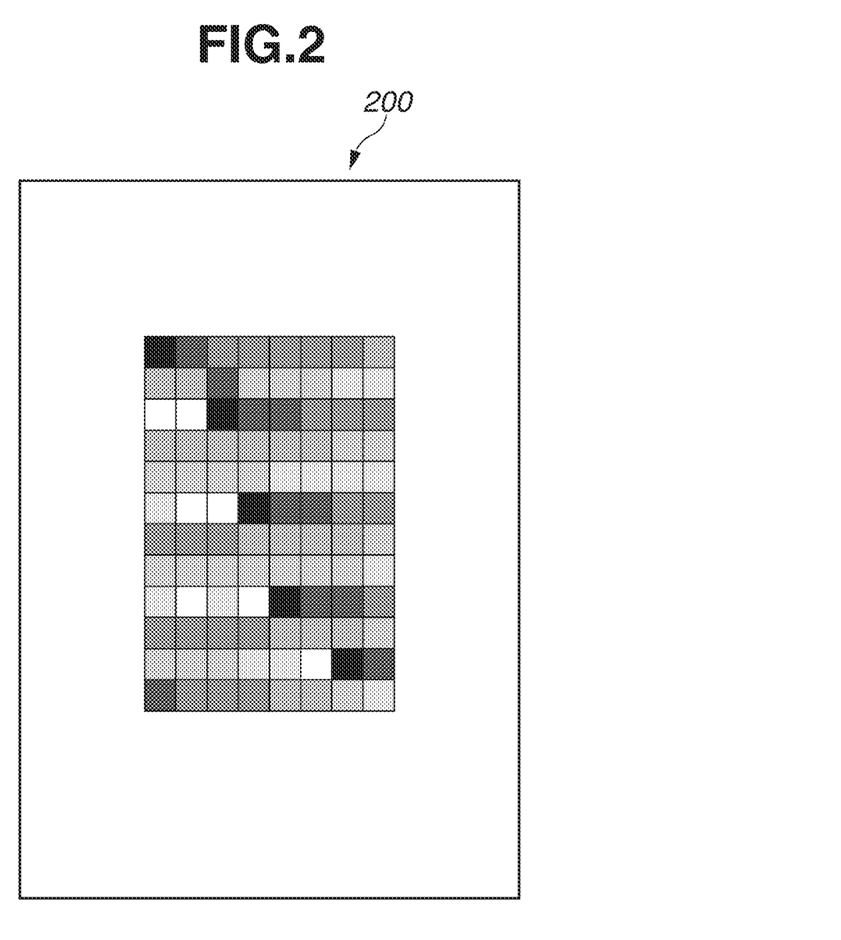
FIG. 2 illustrates an example of a chart used for a print density adjustment.

FIG. 2 illustrates pattern data for the chart used for the print density adjustment.

In the print density adjustment, the multifunction peripheral 100 first selects a cassette targeted for the adjustment, next arranges and draws a pattern of specific density values, and pulls out the print paper from the selected cassette and prints the pattern thereon. The pattern data structured as illustrated in FIG. 2 is printed. The multifunction peripheral 100 reads such a chart from the reading unit 106, measures how much the read density value and the density value generated as the pattern data are different from each other, and adjusts the print density with this difference taken into account.

If the print density adjustment is conducted immediately after the image forming apparatus is powered on, the density becomes dark sometimes and becomes light other times on the chart for the print density adjustment, and slight unevenness may emerge in the chart.

In order to reduce the influence of such slight unevenness on the adjustment, the chart for the adjustment is output after the fixing device is stabilized by printing a predetermined number of sheets.

Figure 3:
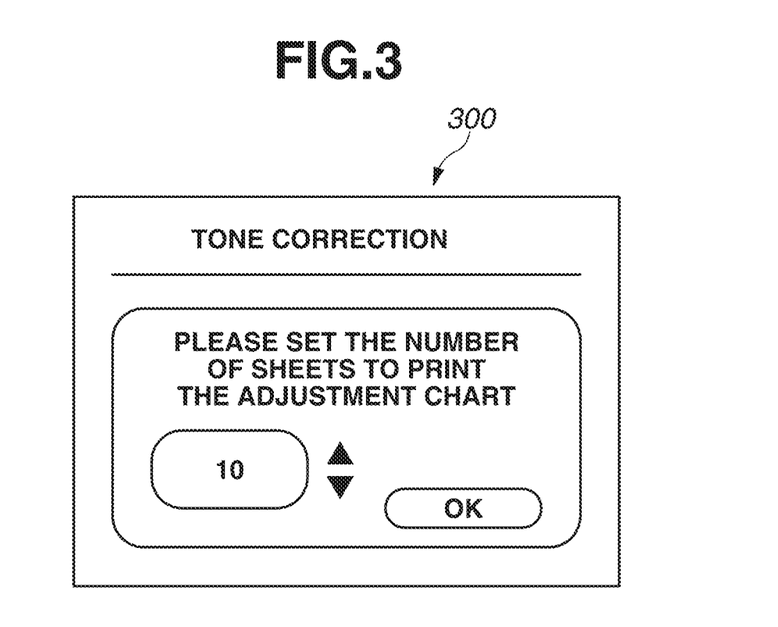
FIG. 3 illustrates the appearance of an operation unit for setting the number of sheets on which the chart for the print density adjustment are to be printed.

FIG. 3 illustrates an operation screen for setting how many sheets the chart for the print density adjustment is to be printed on, which is displayed on the operation unit 105. The number of sheets is set to ten sheets in this screen example, but the number of sheets on which the chart is to be printed can be changed by pressing an up/down button. The number of sheets required until the fixing device is stabilized varies depending on the environment under which this multifunction peripheral is set up, and thus the multifunction peripheral 100 is configured to allow the number of sheets to be changed on the operation unit 105 in this manner.

As described above, the density is not stable on the first chart after the multifunction peripheral 100 is powered on, but is gradually stabilized by printing a plurality of sheets.

Figure 4:
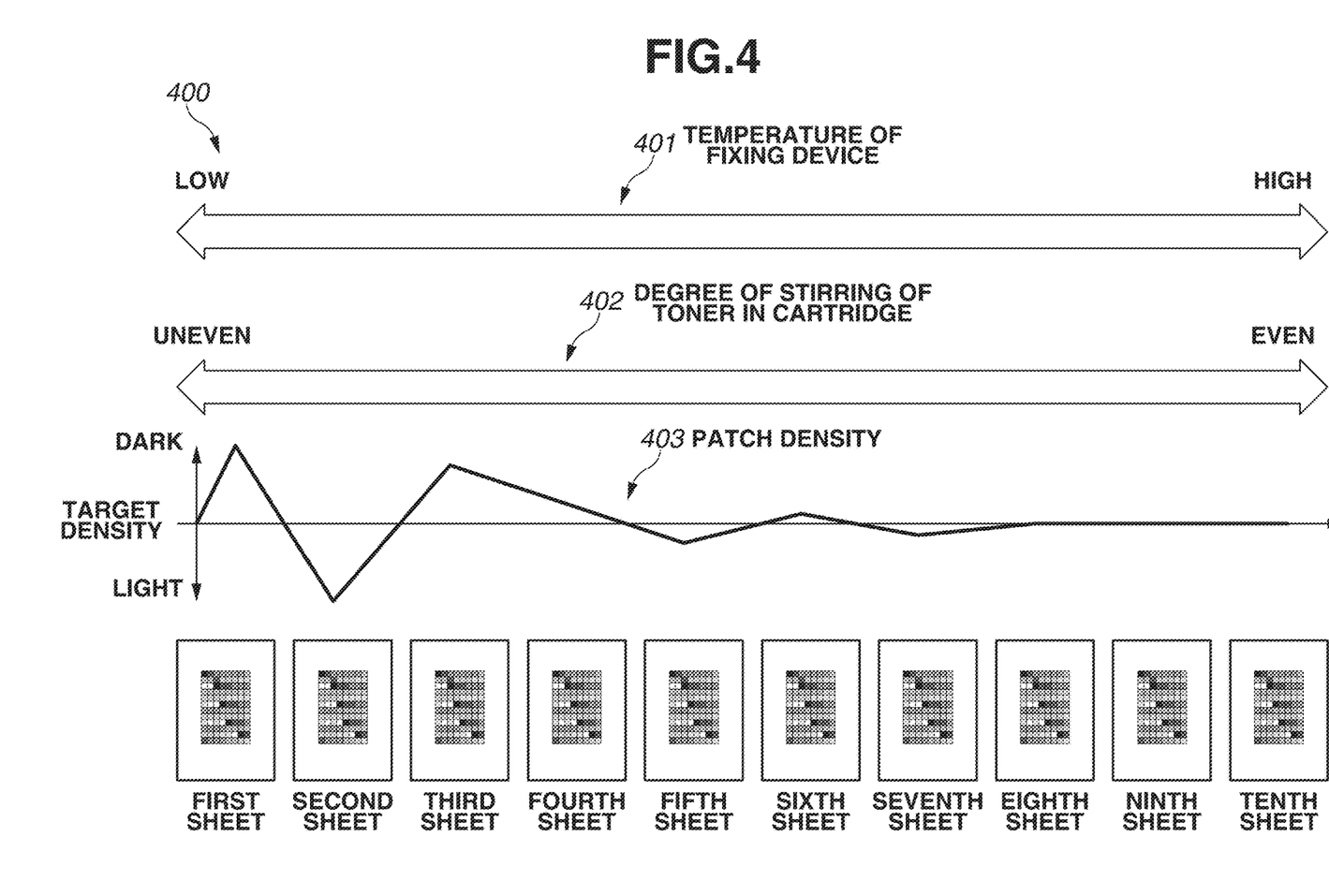
FIG. 4 illustrates how the temperature of a fixing device, the degree to which toner is stirred, and a patch density are changing from printing of a first sheet to printing of a tenth sheet.

FIG. 4 illustrates the degree of this stabilization. This example will be described referring to the stabilization in a case where ten sheets are printed. While printing ten sheets will be described in the present exemplary embodiment, this is merely an example and this number may be either ten or more, or ten or less. Supposing that this number is ten by way of example, the temperature of the fixing device increases as the number of printed sheets increases from the first sheet to the tenth sheet. Needless to say, the first sheet is also printed after the temperature increases to a temperature sufficient for the fixing, but the temperature does not yet fully increase to the maximum temperature and thus the first sheet ends up having unevenness in the fixing although only slightly (401).

Further, another possible cause is the degree of stirring of the toner contained in the toner cartridge. As the number of printed sheets increases from the first sheet to the tenth sheet, the toner in the toner cartridge is stirred so as to become even inside the cartridge. Needless to say, the first sheet is also printed after the toner is stirred so as to exceed a certain print quality, but the toner is not yet fully stirred sufficient to achieve evenness (402) and thus the first sheet ends up having unevenness in the fixing although only slightly.

A patch density 403 illustrated in FIG. 4 corresponds to an example indicating which degree of patch density is acquired on the chart for the print density adjustment, which is the actual printout, due to the causes described above. The density is unstable on the printouts in the first half, about the first chart to the third chart, as the density becomes dark sometimes and becomes light other times. The image density exhibits such a change that the density starts to be stabilized from about the fifth sheet and is approximately stabilized on the tenth sheet.

In this manner, the print density adjustment chart has an approximately stable density on the tenth sheet. Nevertheless, even the density adjustment chart on the tenth sheet also contains slight print unevenness. Moreover, in a case where this chart is read, a slight error may also occur in the reading. If these errors are accumulated, the print density adjustment is undesirably affected by them. The influence further strikingly emerges on machine types required to satisfy a highly accurate color adjustment, such as printers for commercial use.

Under these circumstances, in the present exemplary embodiment, the print density adjustment is highly accurately conducted by utilizing the print density adjustment charts in the latter half that are printed at relatively stable densities and measuring the density based on the charts on a plurality of sheets with respect to the density value on each page.

In a case where the print density adjustment is conducted based on the charts on the plurality of sheets, the charts on the plurality of sheets are to be read by the scanner 106. The multifunction peripheral 100 is configured to cause the printed charts (all of the ten sheets in this example) to be placed on the ADF and read in therefrom to reduce the user's time and effort in the present exemplary embodiment, but may be configured to cause the user to set the charts one by one under the platen of the scanner 106 and read in the charts one by one using the platen.

Figure 5:
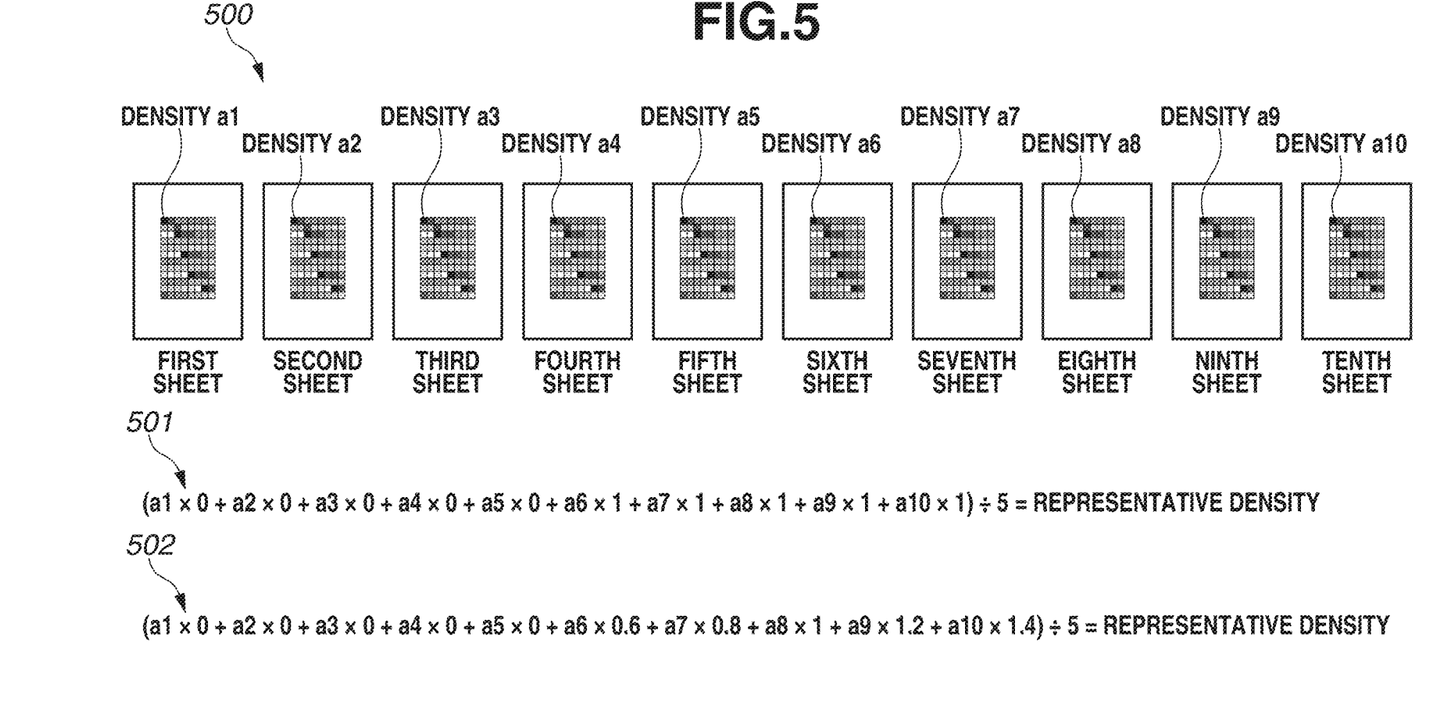
FIG. 5 illustrates an equation for determining a representative density using the charts on the first to tenth sheets.

FIG. 5 illustrates a mechanism for determining the density value of the chart in a case where the ten sheets are read from the ADF.

As indicated in 500, assume that a1 represents the density of an upper left patch on the first sheet, a2 represents that on the second sheet, . . . and a10 represents that on the tenth sheet. In an example 501, the five sheets in the first half may contain slight density unevenness therein, and thus are excluded from the calculation of the patch density. The average of the densities on the sixth to tenth sheets in the latter half is then obtained and is used as a representative density of the patch image a.

In an example 502, similarly, the five sheets in the first half are also excluded from the calculation of the patch density. Regarding the sixth to tenth sheets, the print density is being stabilized along with an increase in the number of printouts in the latter half, and thus the representative density of the patch image a is determined based on the charts on the five sheets in such a manner that a lighter weight is placed on the sixth sheet and a heavier weight is placed on the tenth sheet.

The multifunction peripheral 100 may not read the charts on the five sheets in the first half although setting them under the platen of the scanner 106 and conveying them one by one.

An identification (ID) (an identifier) indicating the page number may be printed on a blank space of each of the printed charts. In reading the charts with the IDs printed therewith by the scanner 106, the multifunction peripheral 100 may not read an ID 1, which indicates the page number 1, to an ID 5, which indicates the page number 5, and read an ID 6, which indicates the page number 6, to an ID 10, which indicates the page number 10. In reading the charts with the IDs printed therewith by the scanner 106, the multifunction peripheral 100 may read the ID 1, which indicates the page number 1, to the ID 5, which indicates the page number 5, but may not use them for the calculation of the representative density.

Printing the ID indicating the page number allows the charts on the ten sheets to be placed even in a random order when the charts on the ten sheets are set on the ADF.

The average of the densities on the sixth to tenth sheets in the latter half is obtained in the present exemplary embodiment, but the pages to average can be set according to an instruction from the user via the operation unit 105. For example, the eighth to tenth sheets in the latter half may be set as the pages to be used to obtain the average of the densities.

In addition, the charts on the five sheets in the first half are printed to reduce the unevenness in the temperature of the fixing device and stir the toner cartridge, and therefore may be printed from an image different from the charts on the five sheets in the latter half.

Determining the density value based on the print density adjustment charts on the plurality of sheets in this manner makes it possible to obtain the density value more accurately, thus more accurately performing the print density adjustment than in determining the density value based on the single print density adjustment chart on the tenth sheet, consequently.

Determining the density value of the patch image based on the print density adjustment chart on the tenth sheet undesirably leads to the necessity of retrying the print density adjustment if blur or the like has occurred due to a trouble when the chart is printed. In a case where an abnormality, such as the blur, cannot be detected, the print density may be unable to be adjusted correctly.

Figure 6:
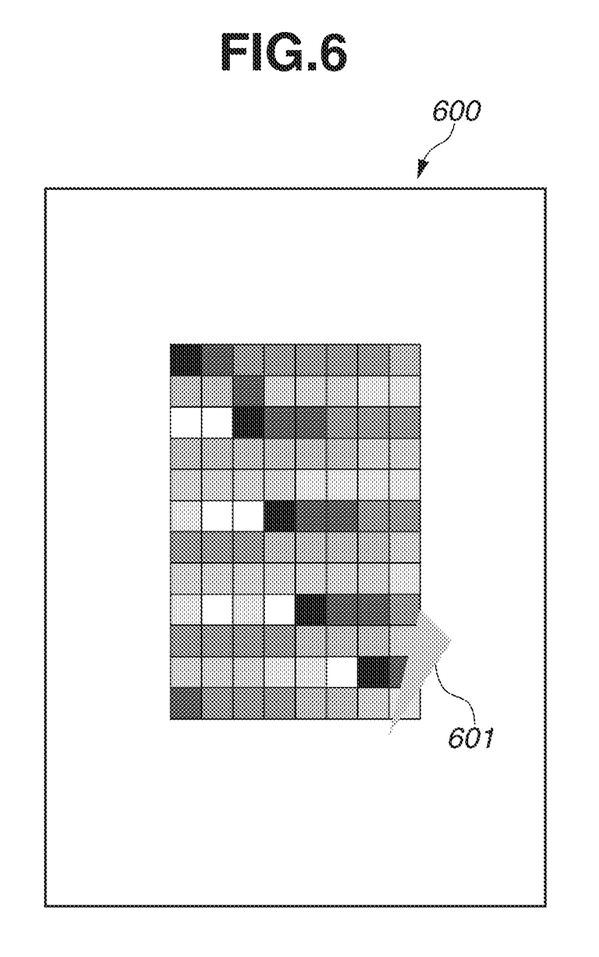
FIG. 6 illustrates an example in which a print failure is contained in the chart used for the print density adjustment.

FIG. 6 illustrates the appearance of the blur on the print density adjustment chart. In this example, a print abnormality 601 has occurred on the lower right side in the patch group. Such a chart makes it impossible to correctly conduct the print density adjustment.

Figure 7:
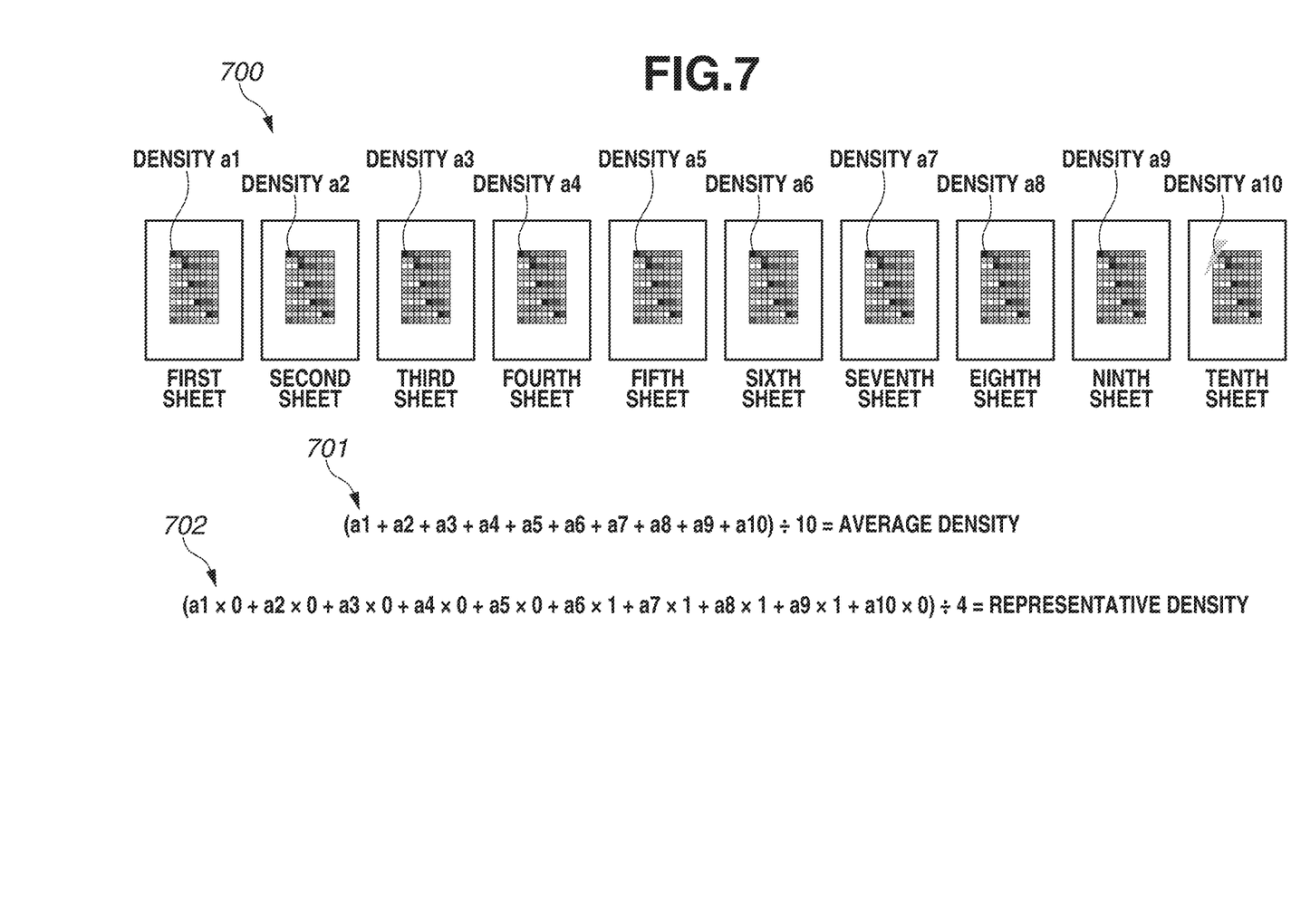
FIG. 7 illustrates an equation for determining the representative density in a case where the chart containing the print failure is output on the tenth sheet using the charts on the first to tenth sheets.

FIG. 7 illustrates a method for the print density adjustment using the charts on the plurality of sheets when the charts include the chart in which the print abnormality has occurred.

As in FIG. 5, a1 represents the density of the upper left patch on the first sheet, a2 represents that on the second sheet, . . . and a10 represents that on the tenth sheet. The print abnormality has occurred at the patch position of a10 on the tenth sheet. In this case, the multifunction peripheral 100 first acquires the average value of all of them. This means simply calculating the average value of a1 to a10 (701). The multifunction peripheral 100 then compares each of the values a6 to a10 of the patches in the charts on the sixth to tenth sheets used to calculate the patch density with the average value. At this time, in a case where the value of the patch deviates from the average value by, for example, a value as large as 10% or more as the density value, the multifunction peripheral 100 processes the value of this patch as an abnormal value and does not add it to the calculation. In an example 702, because the patch density value of a10 deviates from the average by 10% or more, the multifunction peripheral 100 determines that this value is an abnormal value and excludes it from the calculation. As a result, the multifunction peripheral 100 uses the average value of a6 to a9 as the representative density value of the patch.

Calculating the density value in this manner enables the print density adjustment to be highly accurately conducted even in a case where a part of the print density adjustment chart is abnormal.

Figure 8:
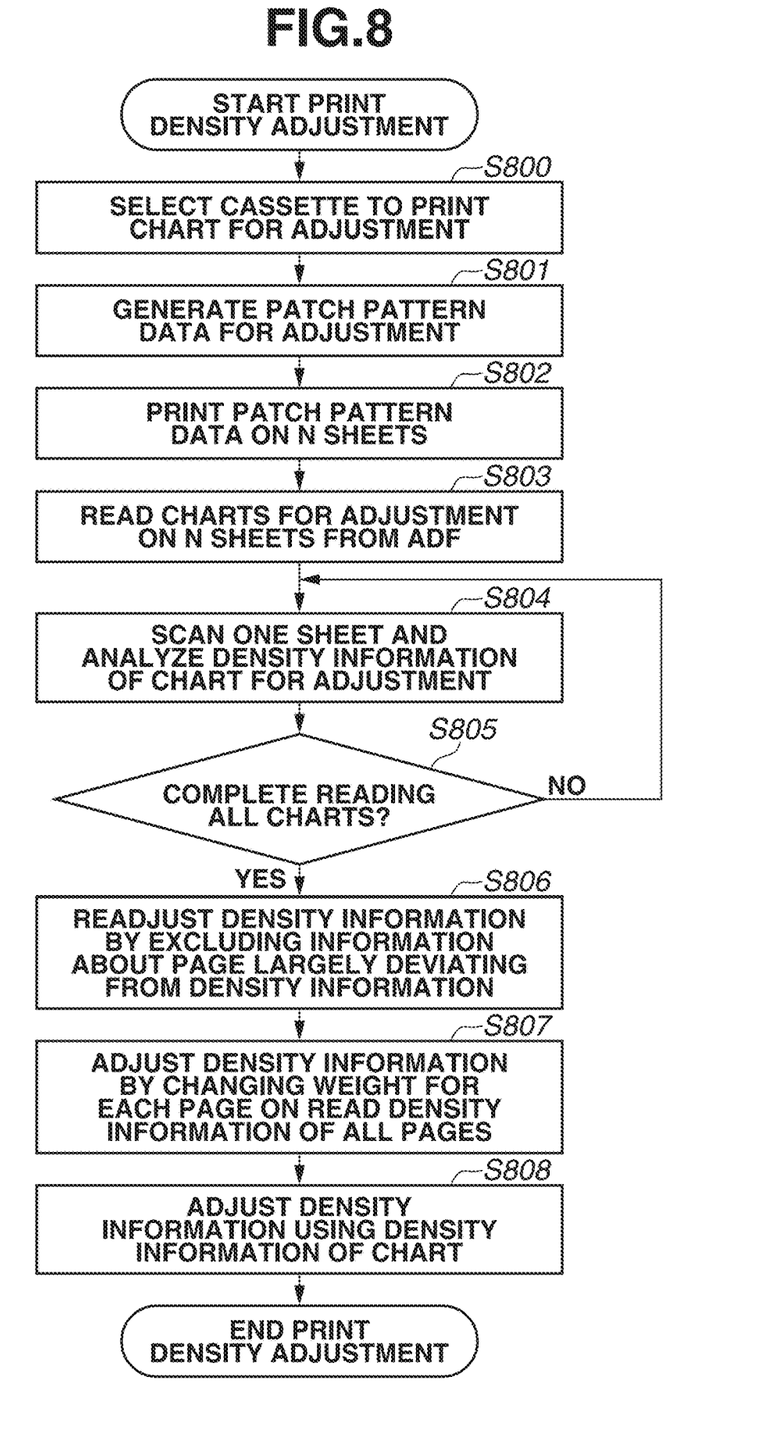
FIG. 8 illustrates a flowchart of print density adjustment processing according to the present exemplary embodiment.

FIG. 8 illustrates a flowchart of the print density adjustment based on the above-described charts on the plurality of sheets.

When the print density adjustment is started, first, in step S800, the user selects the cassette targeted for the adjustment via the operation unit 105. Next, in step S801, the multifunction peripheral 100 generates the patch pattern data for the adjustment in accordance with the type of the paper contained in the selected cassette. In step S802, the multifunction peripheral 100 prints the patch pattern data (the patch images) on n sheets, where n is the number specified on the operation unit 105 illustrated in FIG. 3. In step S803, the multifunction peripheral 100 feeds the density adjustment charts acquired by printing this pattern data from the ADF to the reading unit 106 in the order in which the sheets are printed, and reads the patch images on the sheets. In step S804, the multifunction peripheral 100 reads the sheets one by one from the ADF, and measures the density of the patch image in the chart for the print density adjustment. In step S805, the multifunction peripheral 100 repeats this operation until completing reading all the charts.

After completing reading all the charts (YES in step S805), the processing proceeds to step S806. In step S806, the multifunction peripheral 100 determines the average value of the densities of the patch images on the all pages that have been read by using the calculation expressed as indicated in 701 in FIG. 7, and excludes a density value of a patch image deviating from the average value by a predetermined value or more from the calculation. After that, in step S807, the multifunction peripheral 100 changes the weight on the density value obtained by reading the patch on each page by using the calculation expressed as indicated in 702 in FIG. 7, and determines the representative density of the density of this patch image. For example, the multifunction peripheral 100 carries out the weighted calculation in such a manner that the densities obtained by reading the patch images on the (M+1)-th sheet and the subsequent sheets printed later are weighted more than the densities obtained by reading the patch images on the first to M-th sheets printed earlier among the plurality of sheets.

In step S808, the multifunction peripheral 100 conducts the print density adjustment using the representative density value of the patch determined in this manner and the target density. The operation in step S807 illustrated in FIG. 8 may be performed so as to determine to set, for example, the average value of the densities of the charts on sheets in the latter half, such as the sixth to tenth sheets, to be the representative density of the patch, as described in conjunction with 501 illustrated in FIG. 5. The processing may proceed to step S807 if YES is determined in step S805 (YES in step S805) while skipping the operation in step S806 illustrated in FIG. 8.

Conducting the print density adjustment according to such a flowchart allows the print density adjustment to be highly accurately conducted.

According to the present exemplary embodiment, the density adjustment can be conducted more accurately than the conventional technique by excluding the adjustment charts printed at unstable print densities immediately after the apparatus is started up from the calculation for the density adjustment, determining the density average value of the charts printed in the latter half that are gradually relatively stabilized, and conducting the print density adjustment based on it.

The print density adjustment can be highly accurately conducted by obtaining the density average value of the plurality of charts while excluding defective data due to, for example, blur at the time of the printing.

According to the present exemplary embodiment, the print density adjustment can be highly accurately conducted by determining the representative density while increasing the weights on the patch images printed at the stable densities.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-113360, filed Jun. 30, 2020, which is hereby incorporated by reference herein in its entirety.

What is claimed is:

1. An apparatus comprising:
    a printing unit configured to print patch images for a density adjustment on a plurality of sheets;
    a reading unit configured to read the patch images on the plurality of sheets in an order in which the plurality of sheets printed by the printing unit is printed;
    a determination unit configured to determine a representative density of densities acquired by reading the patch images by carrying out a weighted calculation for the densities acquired by reading the patch images such that a density acquired by reading a patch image on a sheet printed in a latter part of the plurality of sheets is weighted more than a density acquired by reading a patch image on a sheet printed earlier among the plurality of sheets; and
    a performing unit configured to perform a print density adjustment using the determined representative density and a target density.

2. The apparatus according to claim 1, wherein the determination unit determines the representative density based on the densities acquired by reading patch images on an (M+1)-th sheet and a sheet/sheets subsequent thereto without using the densities acquired by reading patch images on a first sheet to an M-th sheet printed earlier.

3. The apparatus according to claim 2, wherein the determination unit determines an average value of the densities acquired by reading the patch images on the (M+1)-th sheet and the sheet/sheets subsequent thereto to be the representative density without using the densities acquired by reading the patch images on the first sheet to the M-th sheet printed earlier.

4. The apparatus according to claim 1, wherein the determination unit calculates an average value of the densities acquired by reading the patch images on the plurality of sheets and carries out the weighted calculation while excluding a density value of a patch image deviating from the average value by a predetermined value or more.

5. The apparatus according to claim 1, wherein the reading unit reads the sheets using an automatic document feeder.

6. The apparatus according to claim 1, further comprising a setting unit configured to set the number of sheets on which the patch images for the density adjustment are to be printed.

7. A method for controlling an apparatus, the method comprising:
    printing patch images for a density adjustment on a plurality of sheets;
    reading the patch images on the plurality of sheets in an order in which the plurality of printed sheets is printed;
    determining a representative density of densities acquired by reading the patch images on the plurality of sheets by carrying out a weighted calculation for the acquired densities such that a density acquired by reading a patch image on a sheet printed in a latter part of the plurality of sheets is weighted more than a density acquired by reading a patch image on a sheet printed earlier among the plurality of sheets; and performing a print density adjustment using the determined representative density and a target density.

8. The method according to claim 7, wherein, in the determining, the representative density is determined based on the densities acquired by reading patch images on an (M+1)-th sheet and a sheet/sheets subsequent thereto without using the densities acquired by reading patch images on a first sheet to an M-th sheet printed earlier.

9. The method apparatus according to claim 8, wherein, in the determining, an average value of the densities acquired by reading the patch images on the (M+1)-th sheet and the sheet/sheets subsequent thereto is determined to be the representative density without using the densities acquired by reading the patch images on the first sheet to the M-th sheet printed earlier.

10. The method apparatus according to claim 7, wherein, in the determining, an average value of the acquired densities is calculated and the weighted calculation is carried out while a density value of a patch image deviating from the average value by a predetermined value or more is excluded.

11. The method apparatus according to claim 7, wherein, in the reading, the plurality of sheets is read using an automatic document feeder.

12. The method apparatus according to claim 7, further comprising setting the number of sheets on which the patch images for the density adjustment are to be printed.

13. An apparatus comprising:
a printing unit configured to print images for a density adjustment on a plurality of sheets;
a reading unit configured to read an image on a sheet printed in a latter part of the plurality of sheets among the printed plurality of sheets;
a determination unit configured to determine a representative density by calculating from at least a first density value read from an image at a predetermined position on a first sheet and a second density value read from an image at the predetermined position on a second sheet, each of the first sheet and the second sheet being the sheet printed in a latter part of the plurality of sheets; and
a performing unit configured to perform a density adjustment using the determined representative density and a target density.

14. The apparatus according to claim 13, wherein the determination unit calculates an average value of densities acquired by reading a patch image on the sheet printed in a latter part of the plurality of sheets and carries out a weighted calculation while excluding a density value of a patch image deviating from the average value by a predetermined value or more.

15. The apparatus according to claim 13, wherein the reading unit reads the plurality of sheets using an automatic document feeder.

16. The apparatus according to claim 13, further comprising a first setting unit configured to set the number of sheets on which patch images for the density adjustment are to be printed.

17. The apparatus according to claim 13, further comprising a second setting unit configured to set the number of sheets to be read that are used to calculate the representative density.

18. The apparatus according to claim 13, further comprising an identifying unit configured to identify page numbers of the read sheets by reading page identifiers printed on the plurality of sheets printed by the printing unit.

19. The apparatus according to claim 13, wherein the determination unit determines the representative density based on the densities acquired by reading patch images on an (M+1)-th sheet and a sheet/sheets subsequent thereto without using the densities acquired by reading patch images on a first sheet to an M-th sheet printed earlier.

20. The apparatus according to claim 19, wherein the determination unit determines an average value of the densities acquired by reading the patch images on the (M+1)-th sheet and the sheet/sheets subsequent thereto to be the representative density without using the densities acquired by reading the patch images on the first sheet to the M-th sheet printed earlier.

* * * * *